Jan. 8, 1946.     E. BLETZ     2,392,635

HEATING APPARATUS

Filed June 17, 1942     2 Sheets-Sheet 1

WITNESSES:

INVENTOR
EDWARD BLETZ
BY
ATTORNEY

Jan. 8, 1946.    E. BLETZ    2,392,635
HEATING APPARATUS
Filed June 17, 1942    2 Sheets-Sheet 2
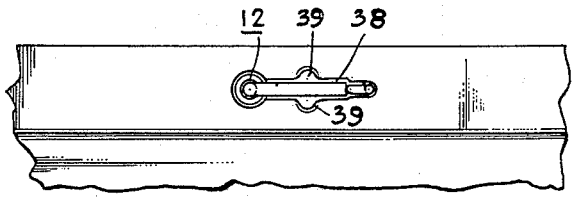
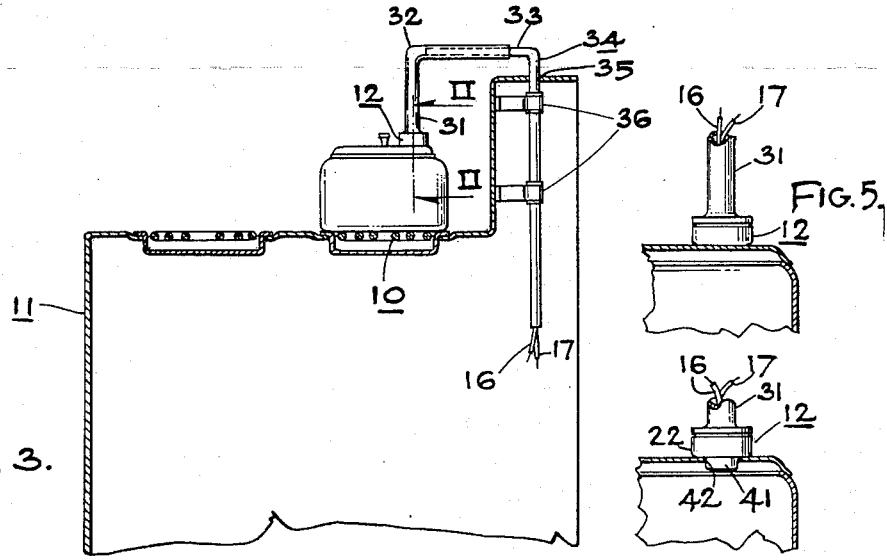
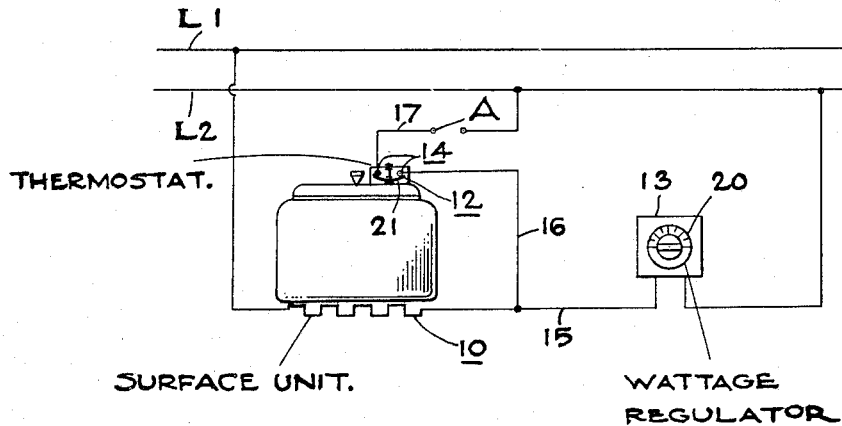
WITNESSES:
Roy H. Enwall.
A. H. Dougherty
INVENTOR
EDWARD BLETZ.
BY W. J. Eisinger
ATTORNEY Patented Jan. 8, 1946

2,392,635

UNITED STATES PATENT OFFICE 2,392,635

HEATING APPARATUS

Edward Bletz, Lexington, Ohio, assignor to Westinghouse Electric Corporation, East Pittsburgh, Pa., a corporation of Pennsylvania Application June 17, 1942, Serial No. 447,359

2 Claims. (Cl. 219—37)

This invention relates to electric heating devices and more particularly to that type having a heating unit provided with a control for regulating the heat output of the unit and it has for an object to provide an improved device of the character set forth.

In my copending application, Serial No. 406,781, filed August 14, 1941, and assigned to the assignee of the present application, there is disclosed a control system for a surface unit of an electric cooking range which maintains the unit on high heat or full wattage input until the food to be cooked reaches a predetermined temperature, such as the boiling point of water, and then automatically reduces the average wattage input to the heating element to any desired value, as determined by the adjustment of the control system, to maintain the food at the predetermined temperature to complete the cooking thereof.

The control system disclosed in my mentioned application comprises a thermostat mounted in the center of a range surface unit in a position to engage and be responsive to the temperature of the cooking vessel heated on the surface unit, and an intermittently-operating circuit-interrupting device remote from the surface unit and adjustable to vary the average wattage input to the surface unit. The vessel-engaging thermostat is surrounded by a heat-insulating sleeve to block the transmission of heat directly from the surface unit to the thermostat. This thermostat maintains the surface unit continuously energized until the vessel and its contents reach a predetermined temperature, after which the control of the surface unit is cut back to the adjustable circuit-interrupting device which reduces the energy input to the surface unit to provide sufficient heat to maintain the vessel and its contents at the predetermined temperature. The thermostat when once opened by the heat of the vessel normally remains open during the remainder of the cooking operation, since the circuit-interrupting device is capable of being adjusted to provide more than enough energy to maintain the vessel at the predetermined temperature.

It will be appreciated that it is not always possible to completely thermally insulate a thermostat, mounted in or closely adjacent the surface unit, from the heat of the unit, with the result that the thermostat is heated thereby and may not accurately measure the temperature of the vessel resting on the surface unit.

It is accordingly a further object of the present invention to provide a control system which may be like that disclosed in my copending application and in which the vessel-engaging thermostat responds accurately to the temperature of a vessel heated by a surface unit and which is substantially unaffected by the heat of the surface unit.

These and other objects are effected by the present invention as will be apparent from the following description and claims taken in connection with the accompanying drawings, forming a part of this application, in which:

Fig. 3 is a vertical section of the range illustrated in Fig. 1, taken substantially on the line III—III of that figure;

Fig. 4 is a fragmentary plan view of the range illustrated in Fig. 1, showing one manner in which the vessel-engaging thermostat and its supporting structure may be substantially concealed in the back-splasher when not in use;

Fig. 5 represents a portion of Fig. 3 shown on an enlarged scale, the vessel being shown in section;

Fig. 6 is a view similar to Fig. 5, showing a slightly modified form of the invention; and, Fig. 7 is a schematic wiring diagram of a circuit employed in incorporating the present invention in the range of Fig. 1.

Figure 1:
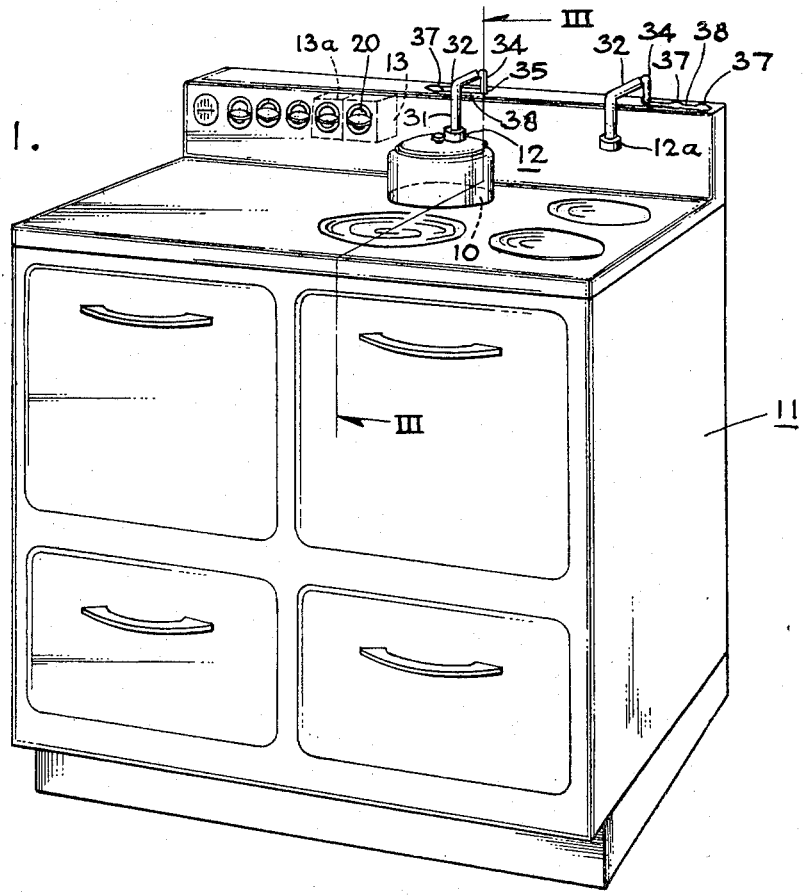
Fig. 1 is a perspective view of an electric cooking range in which the present invention is incorporated.

Referring to the drawings and particularly to Fig. 7, there is shown a schematic wiring diagram of a control system for automatically controlling the operation of an electrical heating element, such as a surface unit 10 of the range 11 illustrated in Fig. 1. In this diagram, one of the surface units 10 is connected in a circuit controlled by a thermostat 12 and a wattage regulator or the like, indicated diagrammatically by the rectangle 13. The thermostat 12 is adjustably mounted in a manner described in detail hereinafter so that it may be readily placed in engagement with a vessel, or the cover thereof, resting on the surface unit 10. The wattage regulator 13 may be mounted in any convenient position on the range, as at the rear of the backsplasher (Fig. 1).

The thermostat 12 includes a switch 14 and is adjusted, preferably by the manufacturer, to open this switch when the vessel which it engages reaches a predetermined temperature, such as the boiling point of water. As long as the thermostat is below its switch-opening temperature, the heating element 10 in the circuit shown in Fig. 7 is connected across the line conductors L1—L2, through a circuit traceable from one line conductor L1, heating element 10, conductors 15 and 16, closed contacts of the switch 14, conductor 17, closed contacts of a manual switch A to the other line conductor L2.

When the thermostat 12 reaches its switch-opening temperature, the switch 14 is opened and the mentioned circuit is interrupted and the wattage regulator 13, which had been shunted by the closed switch A, then completes a circuit for the surface 10.

The wattage regulator 13 may be of any preferred type, such as a rheostat or intermittently-operating circuit-interrupting means like that shown in my copending application mentioned above, and is preferably adjustable over a range between continuous "off" and continuous "on" to provide any desired energy input to the surface unit 10 when the switch A is opened.

From this description, it will be seen that the heating element 10 is continuously energized until the switch 14 is opened, after which the energy input to the heating element is reduced to any desired value as determined by the adjustment of the wattage regulator to complete cooking of the food. Thus a quantity of food placed on the surface unit is rapidly raised to a predetermined temperature by providing full energy input to the surface unit, and then the energy input is automatically reduced to supply only sufficient heat to the vessel and its contents to maintain them at the predetermined temperature during completion of the cooking operation. As long as the vessel is at the predetermined temperature or above the switch-closing temperature of the thermostatic switch 14, the switch remains open and the energization of the surface unit 10 is under the control of the wattage regulator 13.

The range shown in Fig. 1 may be of any desired construction and includes a plurality of surface units 10, each of which may have associated therewith a thermostat 12 and a wattage regulator 13 electrically connected in the manner shown in Fig. 7. The wattage regulator 13 may be mounted at the rear of the range backsplasher and adjusted by means of a knob 20 provided with a suitable scale to indicate the setting thereof. The illustrated range is provided with two thermostats 12 and 12a, which are adapted to engage vessels placed on the two rear surface units of the range, and two wattage regulators 13 and 13a. Since the thermostats 12 and 12a may be identical, a description of one will suffice.

Figure 2:
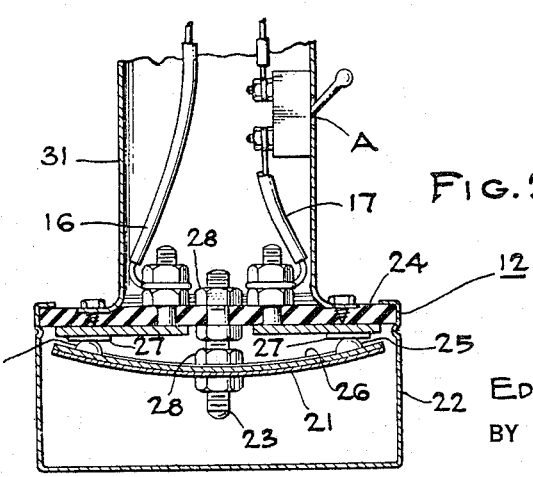
Fig. 2 is a sectional view of a vessel-engaging thermostat forming a part of the present invention, the view being taken substantially on the line II—II of Fig. 3.

The thermostat 12 may be of any preferred construction and is here shown as comprising a bimetal disc 21 (Fig. 2) of the snap-acting type supported within a protective casing 22, although it is to be understood that a creep-type bimetal element may be used if desired. This disc is supported at its center by an adjusting screw 23 mounted in an electrical insulating base plate 24 and carries contacts 25 of the switch 14, which are preferably insulated from the bimetal disc and connected to each other by means of a suitable conductor 26. When the disc is below its critical or snap-over temperature, it is in the position shown in Fig. 2 and the contacts 25 engage and bridge fixed contacts 27 carried by the insulating plate 24. It will be understood that the disc 21 may be adjusted to snap over at any desired temperature by means of the screw 23 and lock nuts 28 carried thereby, as well understood in the art.

The thermostat casing 22 comprises a cap member 29 which is preferably made of light-weight good heat-conducting material such as aluminum or the like. The rim of this cap is flanged in the manner shown in Fig. 2 so that it may be detachably secured to the base plate 24.

The thermostat 12 is adjustably supported on the range so that it may be readily positioned in engagement with the vessel to be heated. As shown particularly in Figs. 1 and 3, the thermostat is attached to one end of an arm 31 of an L-shaped tubular member 32, the other arm of which adjustably and telescopically receives an arm 33 of a second L-shaped tubular member 34. The second L-shaped member 34 extends downwardly through an opening 35 in the top of the backsplasher and is guided for vertical and rotary movement in any suitable manner, as by means of bearing brackets 36 secured to the body or platform of the range. The L-shaped member may either be freely slidable in the brackets 36 or have a fairly tight friction fit therein. In the latter case, the thermostat supporting structure, when raised to any desired position, will remain in the adjusted position as shown at the right in Fig. 1. The tubular L-shaped members 32 and 34 serve as conduits for the conductors 16 and 17.

From the construction described above, it is seen that the supporting structure of the thermostat permits it to be raised or lowered relative to the range body to adapt itself to vessels of different heights and to be swung in an arc about the vertical axis of the second L-shaped member 34. The adjustable telescopic connection between two L-shaped members permits the thermostat to be moved in a horizontal plane over the range. The thermostat 12 may, if desired, be pivotally connected to the lower end of the arm 31 to have universal movement and enable the thermostat to have substantial surface contact with vessel covers whether they be flat or inclined to the horizontal.

When the thermostat is not in use, it may be swung to a position above the top of the backsplasher and lowered into an opening 37 provided in the backsplasher. The backsplasher is also preferably provided with a groove or depression 38 extending between the openings 35 and 37 to receive the telescoped horizontal arms of the L-shaped members, as shown in Fig. 4. This groove or depression may have a wide portion 39 to permit the L-shaped members to be readily grasped when it is desired to place the thermostat in engagement with the body or cover of a cooking vessel.

The conductor 17 which connects the thermostat with the line conductor L2 (Fig. 7) is provided with a manually operated switch S. It is desirable when storing the thermostat in the backsplasher to open this switch so that the surface unit is not connected across the line conductors L1 and L2 and also to permit the surface unit to be manually adjusted by means of the wattage regulator 13 independent of the thermostat 12.

In Fig. 6 there is shown a slightly modified form of the invention in which the bottom of the thermostat casing 22 is provided with a downwardly-extending portion 41 adapted to be received in an opening 42 provided in the cover of the vessel to be heated on the surface unit. With this construction, the thermostat casing is directly exposed to the vapors within the kettle.

It will be appreciated that by having the thermostat engage the top of the cooking vessel, the thermostat is substantially unaffected by heat from the surface unit and, therefore, the thermostat accurately measures the temperature of the vessel which is substantially that of its contents.

It has been found in tests of the present structure that the thermostat accurately measured the temperature of the vessel and its contents regardless of the size of the vessel or the quantity of food in the vessel and responded substantially equally well with the vessels having lids of various materials such as, aluminum, steel and enameled steel, and with covers of various contours, such as, flat, convex and concave. While using a thermostat of the type shown in Fig. 5 with a glass lid, the results were not as good due to the poor heat-conducting property of the glass, accurate results were obtained when the glass lid was provided with an opening such as indicated at 42 in Fig. 6 to expose the bottom of the thermostat casing to the vapors within the vessel or to receive the depending projection 41 of the casing.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a range or the like, a cooking platform having a backsplasher, electric heating means carried by said platform and adapted to heat a cooking vessel or the like placed thereon, a rigid tubular supporting device comprising a vertical part rotatively mounted in the backsplasher and vertically movable to raise the upper end thereof from the top of the backsplasher, a horizontal part extending from said upper end of the first part, and a second vertical part extending downwardly from the other end of the horizontal part, thermostatic means carried by the lower end of said second vertical part, said tubular device being adapted to position said thermostatic means in engagement with a vessel placed on said heating means, said backsplasher being formed to receive said thermostatic means upon rotating the tubular device to bring the same over the backsplasher and then lowering the same, and electrical conductors extending from said thermostatic means through said tubular supporting device and connected in an energizing circuit of said heating means.

2. The combination set forth in claim 1 wherein said backsplasher is formed also to receive said second vertical part.

EDWARD BLETZ.